US012643456B1

(12) United States Patent
Crooker et al.

(10) Patent No.: US 12,643,456 B1
(45) Date of Patent: Jun. 2, 2026

(54) TRAILER OR LIFT WITH BOAT CENTERING PROVISIONS

(71) Applicants: Steve O. Crooker, Oakland, AR (US); Chan T. Crooker, Mtn. Home, AR (US)

(72) Inventors: Steve O. Crooker, Oakland, AR (US); Chan T. Crooker, Mtn. Home, AR (US)

(*) Notice: Subject to any disclaimer, the term of this patent is extended or adjusted under 35 U.S.C. 154(b) by 487 days.

(21) Appl. No.: 18/447,585

(22) Filed: Aug. 10, 2023

Related U.S. Application Data

(60) Provisional application No. 63/370,950, filed on Aug. 10, 2022.

(51) Int. Cl.
B60P 3/10 (2006.01)

(52) U.S. Cl.
CPC ........... B60P 3/1075 (2013.01); *B60P 3/1066* (2013.01)

(58) Field of Classification Search
CPC ..... B60P 3/1075; B60P 3/1066; B60P 3/1033; B63C 1/10; B63C 1/04; B63C 1/02
See application file for complete search history.

(56) References Cited

U.S. PATENT DOCUMENTS

| | | | | |
|---|---|---|---|---|
| 3,077,277 | A | * | 2/1963 | Holzman .............. B60P 3/1066 |
| | | | | D12/101 |
| 3,447,815 | A | * | 6/1969 | West .................... B60P 3/1075 |
| | | | | 280/145 |
| 3,993,324 | A | * | 11/1976 | Carrick ................. B60P 3/1033 |
| | | | | 280/414.1 |
| 4,103,925 | A | | 8/1978 | Palamara .................. B60P 3/10 |
| 4,138,135 | A | * | 2/1979 | Hewitt ................. B60P 3/1075 |
| | | | | 280/414.1 |
| 4,197,050 | A | | 4/1980 | Larson ...................... B60P 1/46 |
| 4,268,211 | A | | 5/1981 | Schwebke ................. B60P 3/10 |
| 4,309,785 | A | | 1/1982 | Budd ...................... B63B 21/64 |
| 4,340,332 | A | | 7/1982 | Davies ...................... B60P 3/10 |
| 4,500,249 | A | | 2/1985 | Johansson ................. B60P 3/10 |
| 4,529,217 | A | * | 7/1985 | Wood .................... B60P 3/1075 |
| | | | | 414/529 |
| 4,684,145 | A | | 8/1987 | Tingley ...................... B60P 3/10 |
| 4,779,887 | A | | 10/1988 | Briggs ...................... B60P 3/10 |
| 4,858,943 | A | | 8/1989 | Cote ......................... B63P 3/10 |
| 5,195,767 | A | | 3/1993 | Des Roches .............. B60P 3/10 |
| 5,299,903 | A | | 4/1994 | Kesselring ............... B60P 1/52 |
| 5,360,226 | A | | 11/1994 | Gussler, Jr. et al. ...... B60P 3/10 |
| 6,616,166 | B2 | | 9/2003 | Marchese ................. B60P 3/10 |
| 7,017,933 | B2 | | 3/2006 | Mickley .................... B60P 3/10 |

(Continued)

*Primary Examiner* — Christopher B Wehrly
(74) *Attorney, Agent, or Firm* — Jonathan A. Bay

(57) ABSTRACT

The invention relates to boat trailers and boat lifts and, more particularly, to centering provisions for assisting guidance and centering of the boat when being re-loaded onto the trailer or parked in a boat slip. The centering provisions include laterally opposed centering constrictors that transition from an OPEN state defining a passageway width allowing free passage of the boat during launching and loading operations, and, a CONSTRICTION state defining a constricted width that is narrower than the passageway width such that the centering constrictors provide guidance and centering of the boat when being loaded onto the trailer parked onto the lift by contact along the boat's rub rail, gunwale or sides at elevations lower than the top ends of the constrictors or their mounts.

20 Claims, 16 Drawing Sheets

(56)　　　　　　References Cited

U.S. PATENT DOCUMENTS

| | | | |
|---|---|---|---|
| 7,896,382 B2 | 3/2011 | Heck ......................... | B60P 3/10 |
| 8,006,995 B2 | 8/2011 | Caudill ..................... | B60P 3/10 |
| 8,256,789 B2 | 9/2012 | Bryant, II ................. | B60P 3/10 |
| 8,628,105 B2 | 1/2014 | MacKarvich ............. | B60P 3/10 |
| 9,056,574 B2 | 6/2015 | Kirchhan ................. | B60P 3/10 |
| 10,232,760 B2 | 3/2019 | Leasure ................... | B60P 3/10 |
| 10,583,768 B2 | 3/2020 | Thorley ................... | B60P 3/10 |
| 10,730,425 B2 | 8/2020 | Yanyk ...................... | B60P 3/10 |
| 11,034,277 B2 | 6/2021 | Bacon et al. ............. | B60P 3/10 |
| 11,745,637 B1 * | 9/2023 | Isley, III .............. | B60P 3/1075 |
| | | | 280/414.1 |
| 2009/0066058 A1 | 3/2009 | Comried, Jr. ............ | B60P 3/10 |
| 2009/0302572 A1 * | 12/2009 | Bryant, II ............. | B60P 3/1075 |
| | | | 414/532 |
| 2011/0133429 A1 | 6/2011 | Caudill ................... | B60P 3/10 |
| 2016/0264220 A1 | 9/2016 | Laceky et al. .......... | B63B 49/00 |
| 2018/0194263 A1 * | 7/2018 | Eigenheer ............. | B60P 3/1075 |

* cited by examiner

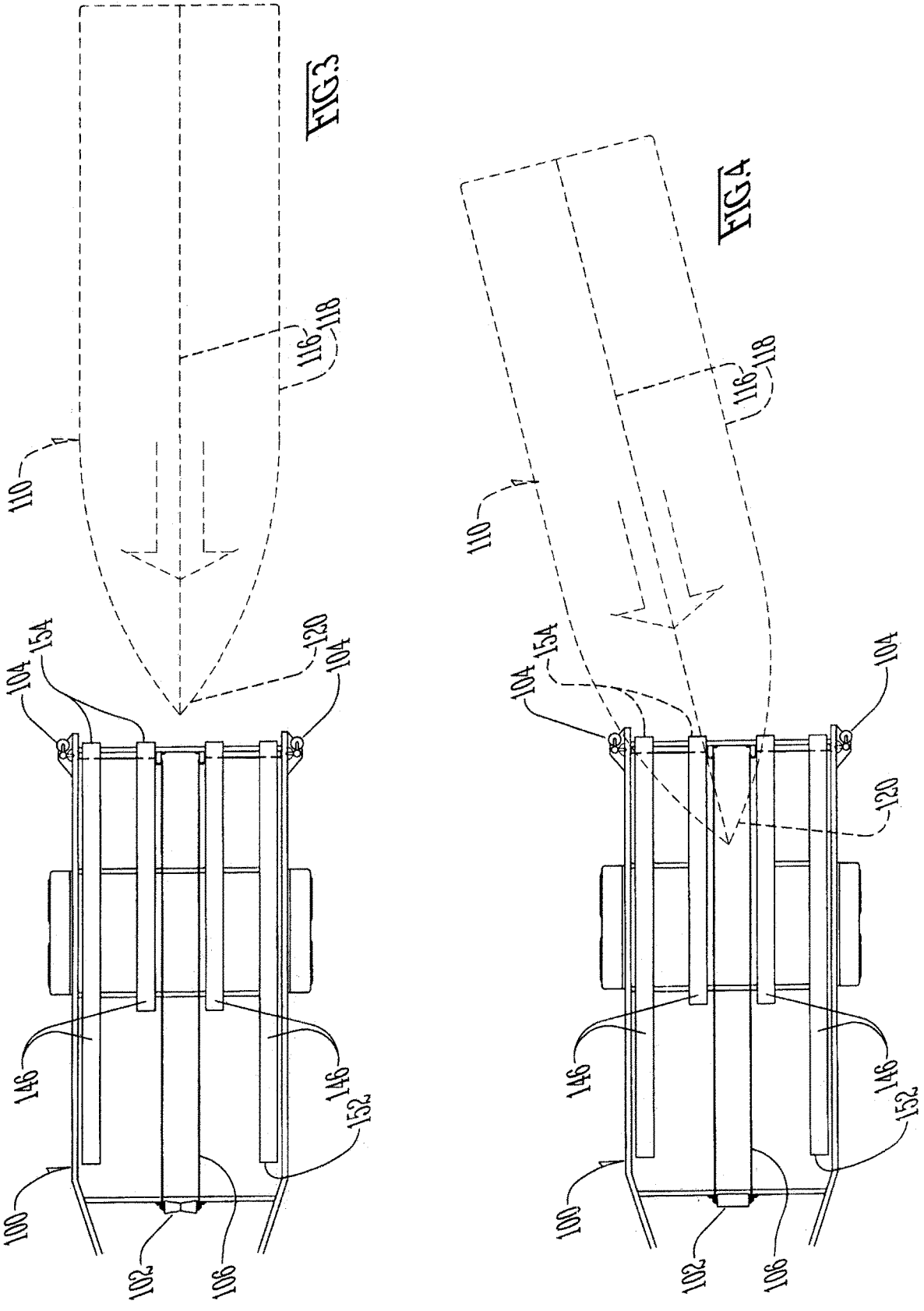

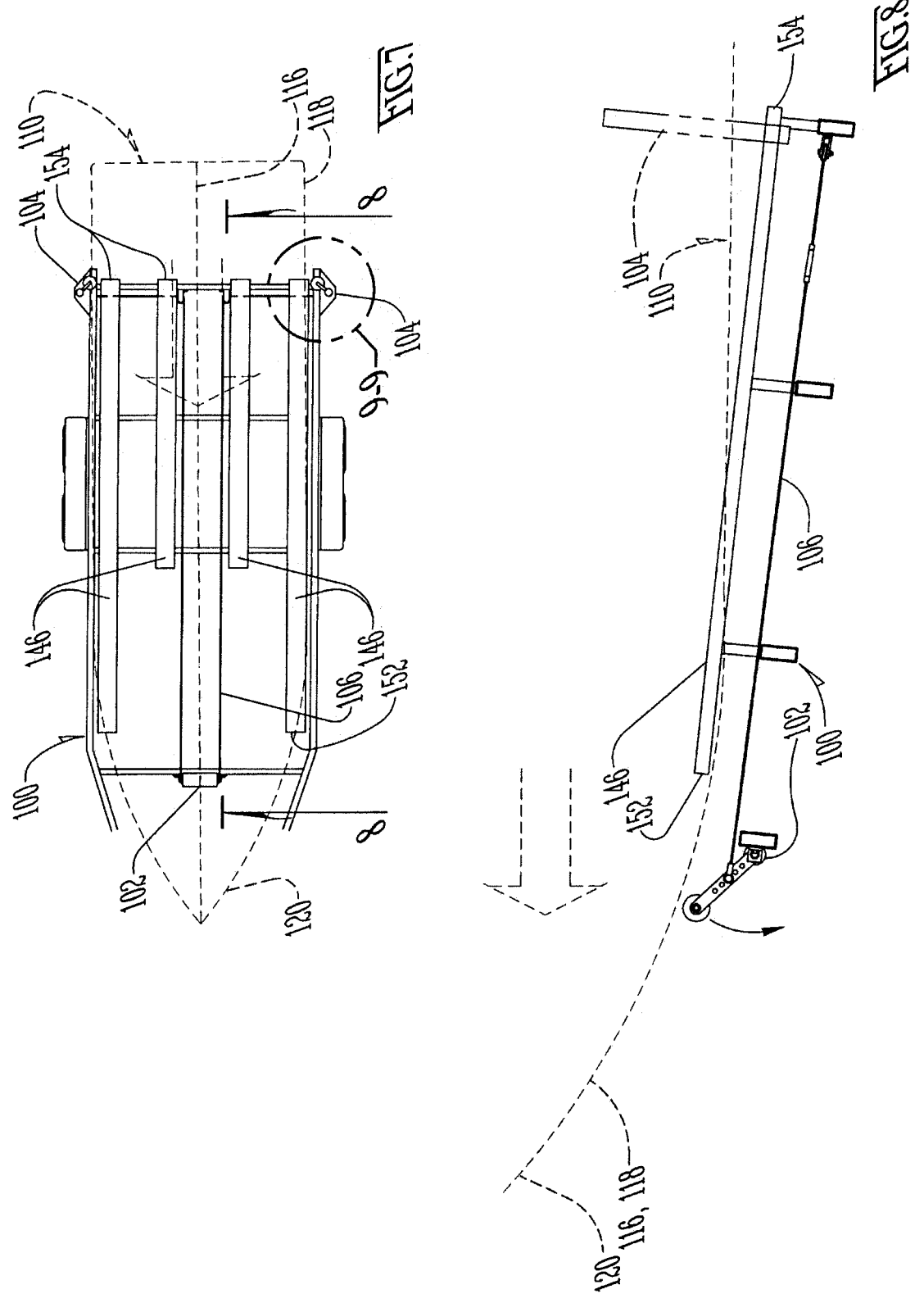

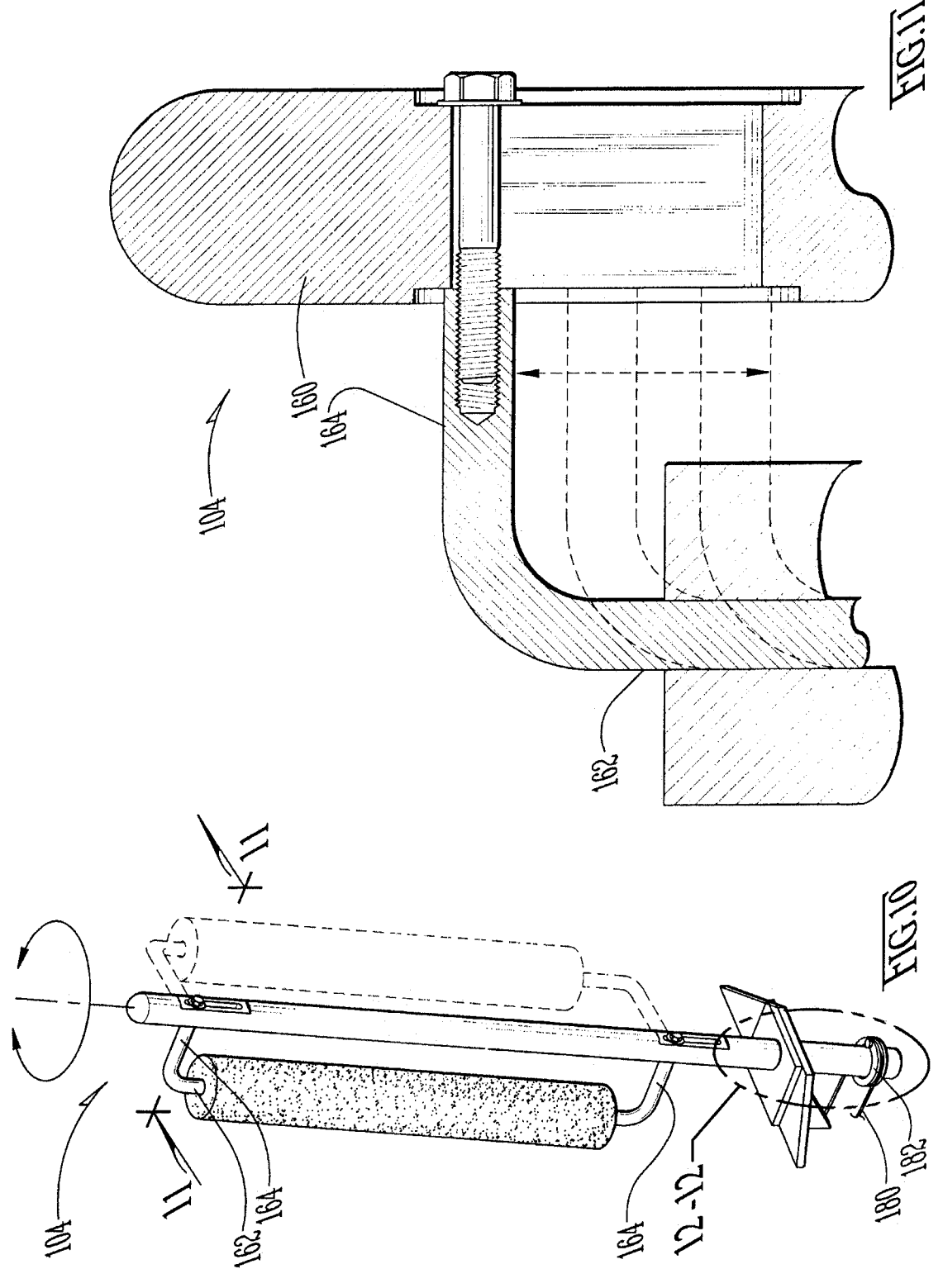

19-19

106'

160'

160'

100'

21-21

102'

TRAILER OR LIFT WITH BOAT CENTERING PROVISIONS

CROSS-REFERENCE TO PROVISIONAL APPLICATION(S)

This application claims the benefit of U.S. Provisional Application No. 63/370,950, filed Aug. 10, 2022. The foregoing patent disclosure(s) is(are) incorporated herein by this reference thereto.

BACKGROUND AND SUMMARY OF THE INVENTION

The invention relates to boat trailers and boat lifts and, more particularly, to centering provisions for assisting guidance and centering of the boat when being re-loaded onto the trailer or parked in a boat slip.

A number of additional features and objects will be apparent in connection with the following discussion of the preferred embodiments.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 3 is a reduced-scale top plan schematic view showing the trailer in preparation for hauling out the boat, wherein not shown here are any indications of a ramp or water's edge as at least as sketchily indicated in FIGS. 15 and 16, but the trailer here in this view is likewise disposed on a ramp (again not shown) halfway or more into the water and the boat here is afloat behind the trailer:—in fact, the boat here is shown in an idealized perfect alignment;

FIG. 4 is a top plan schematic view comparable to FIG. 3 except not only showing the boat further along in the re-loading process, but also showing obvious misalignment, which is surely unintentional according the best wishes of the driver (not shown) but is perhaps the unavoidable consequence of crosswinds, or waves or current and so on;

FIG. 7 is a top plan schematic view comparable to FIGS. 3-5 except showing the boat fully loaded onto the trailer;

FIG. 8 is an enlarged-scale side elevation view of FIG. 7, comparable to FIG. 6, and taken in the direction of arrows 8-8 in FIG. 7, showing the keel of the boat has essentially flattened the lever;

FIG. 10 is a full perspective view of the left side constrictor of FIG. 9 supported by its respective guide post which is driven by the actuation of the lever to pivot like an axle;

FIG. 11 is an enlarged-scale section view taken along the line 11-11 in FIG. 10;

DETAILED DESCRIPTION OF THE PREFERRED EMBODIMENTS

Figure 1:
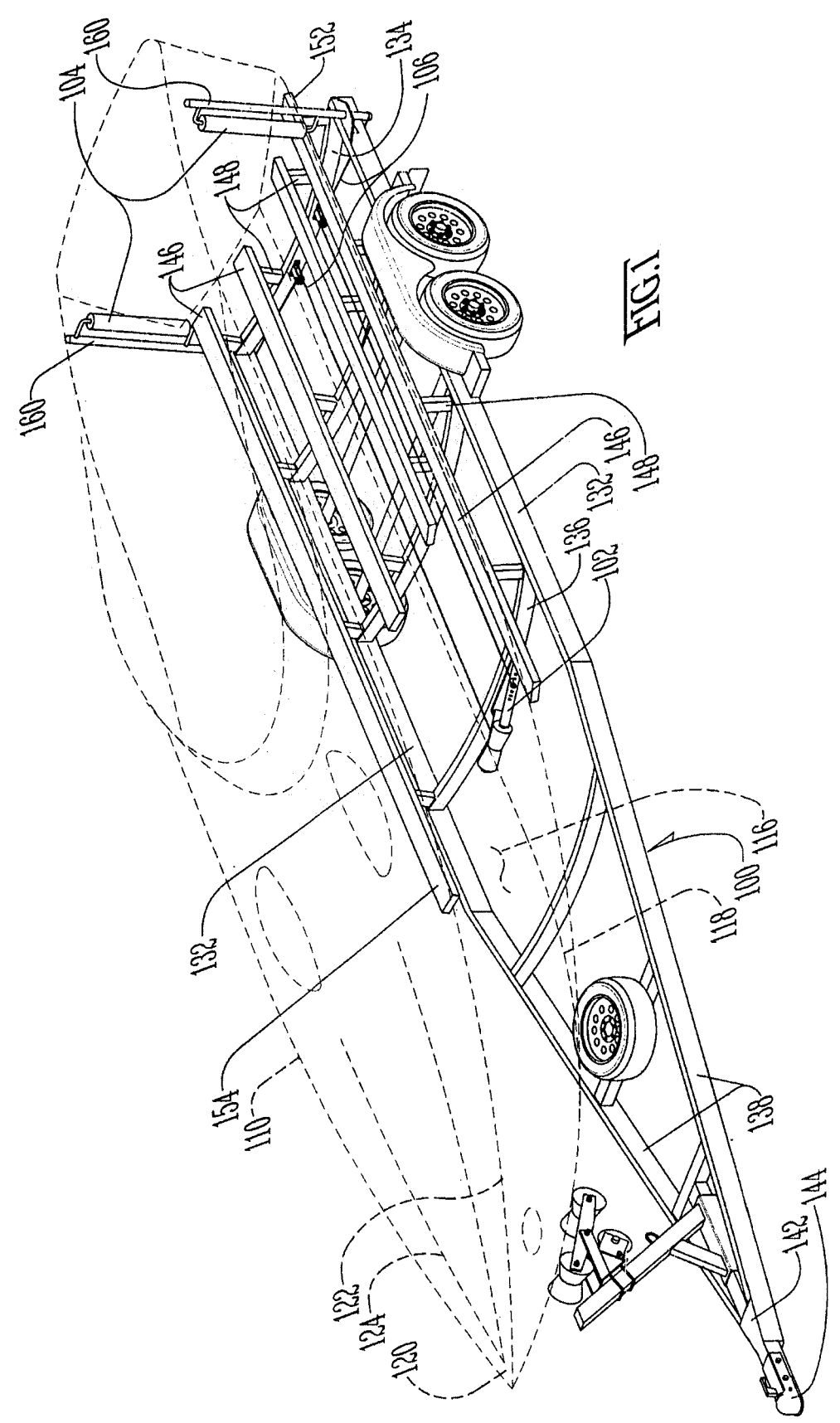
FIG. 1 is a perspective view of a boat trailer in accordance with the invention, provided with centering provisions in accordance with the invention, for assisting guidance and centering of a boat when being re-loaded onto the trailer.
Figure 15:
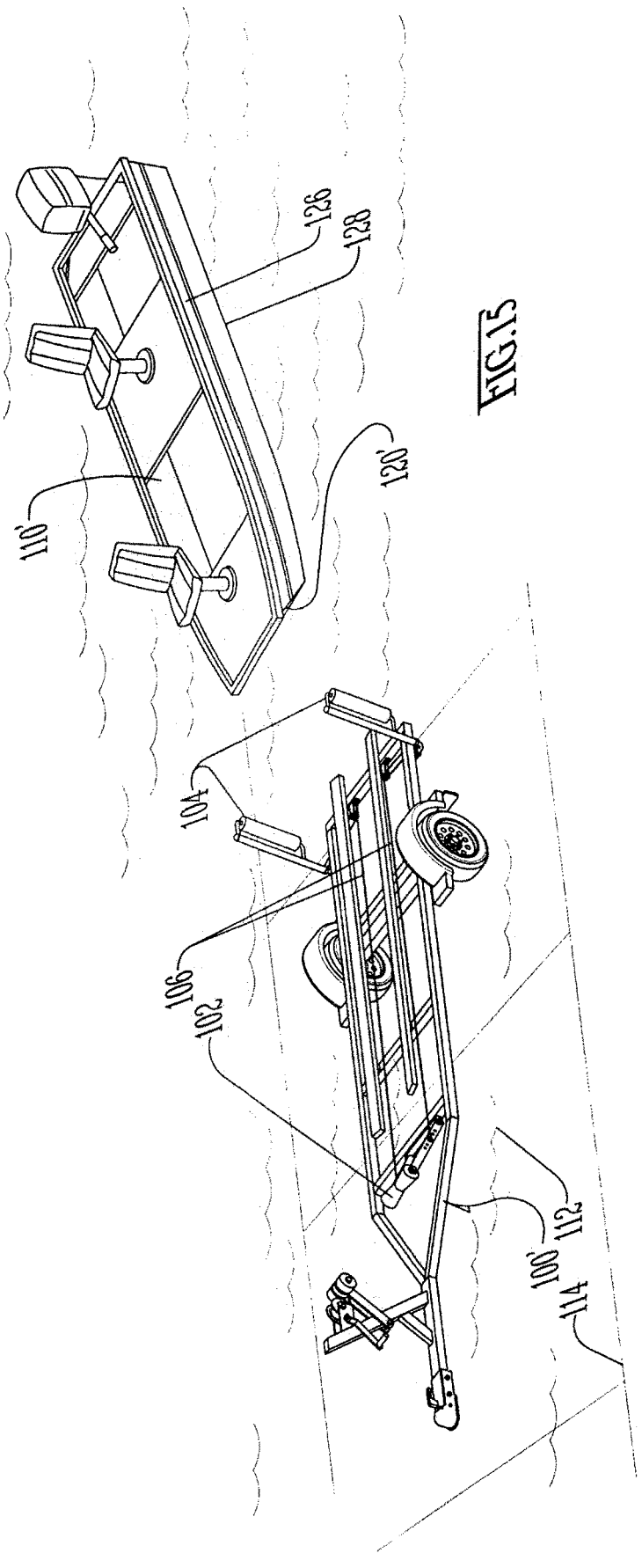
FIG. 15 is a view comparable to the situation in FIG. 4 except comprising a perspective view rather than a top plan view, and with a further exception being that this view shows an alternate embodiment of a trailer in accordance with the invention, provided with an alternate embodiment of centering provisions in accordance with the invention, and a different style of boat (eg., a flat-bottomed boat)
Figure 16:
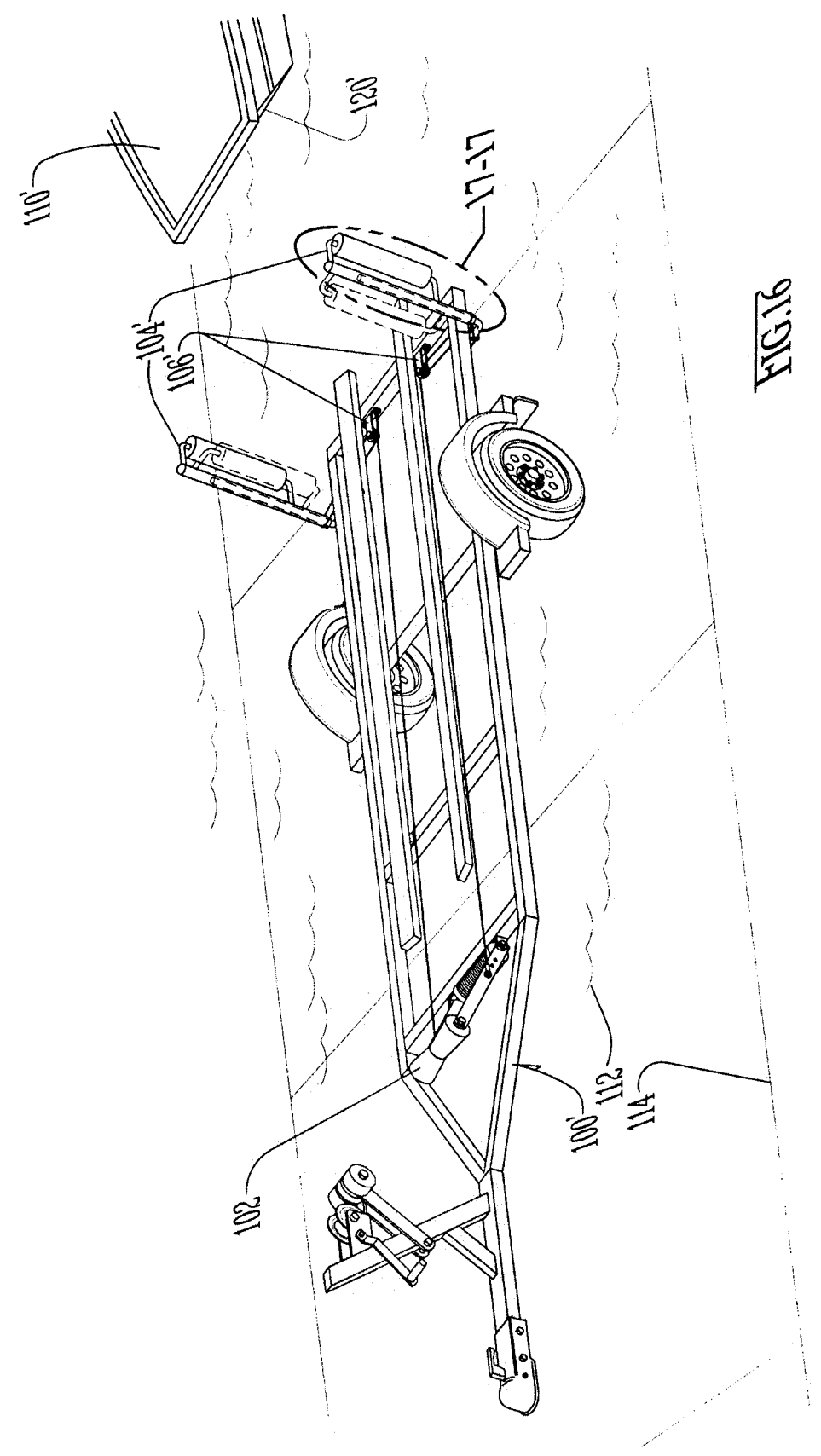
FIG. 16 is a perspective view comparable to FIG. 15 except on an enlarged scale.

FIGS. 1, 15 and 16 (among others) shows a trailer 100 in accordance with the invention provided with centering provisions 102, 104 and 106 in accordance with the invention as for centering a boat 110 on the trailer 100 during the re-loading process when hauling the boat 110 out of the water 112 at a ramp 114.

FIG. 1 shows a boat 110 with a V-hull 116 that will have a keel 118 arching up forwardly to a bow 120. The widest width from side to side across this type of boat 110 will typically be between left and right extremes on the rub rail 122 (which covers the generally horizontal seam between the top deck 124 and hull 116). FIG. 15 shows a flat-bottomed boat 110' which while it still has a bow 120', its widest width from side to side will be across left and right extremes of the gunwale 126. This flat-bottomed boat 110' is characterized by (almost needless to say) its flat bottom 128 (perhaps also by its lack of a top deck). There might be rub strips along the gunwale 126 too, but these are not shown.

The centering provisions 102, 104 and 106 could be easily incorporated into the original manufacture of the trailer 100. Otherwise, trailers 100 (even boat lifts 130 for marina boat slips, see FIG. 20) can be retrofitted with an after-market kit that could be converted with bolt-on attachment of:

(1) a mechanical lever 102 which has a forward throw from generally upright to generally horizontally flattened, (2) a left and right opposed pair of inward moving centering constrictors 104, and (3) a drive system 106 comprising any of cables and pulleys or linkages and so on, as well as springs and spring tensioners.

Figure 2:
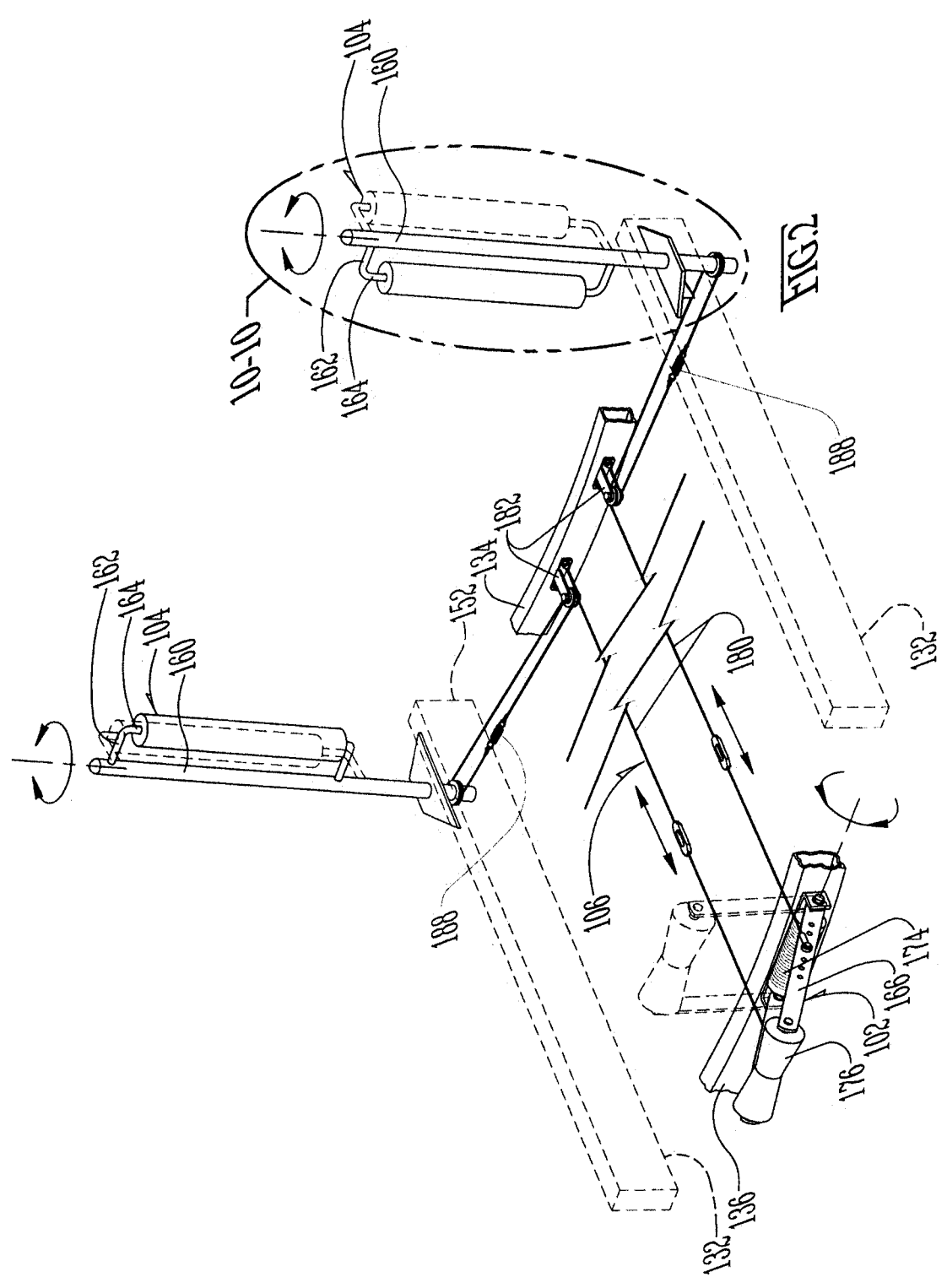
FIG. 2 is an enlarged-scale perspective view of the centering provisions in accordance with invention wherein the boat and trailer are removed from view; Note that, FIGS. 3 through 9 serve as a slide show to show the operation of re-loading the boat and the assistance provided by the centering provisions.

In FIG. 2, the trailer 100 comprises a framework of heavy beams mounted on some sort of axle package (single axle shown rather than tandem) which rolls over a roadway on tires. The framework comprises laterally spaced left and right side beams 132, a heavy rear cross beam 134, a series of heavy mid-span cross beams 136, and a deltoid-shaped front structure 138 that ties together the front ends 142 of side beams 132 with a forward terminus comprising a tongue 144.

The trailer 100 further comprises a pair of stationary, laterally-spaced left and right flat longitudinally-elongated bunks 146. The bunks 146 are propped up off the heavy cross beams 134 and 136 by props 148 and thus lie in elevations spaced above the cross beams 134 ad 136. These bunks 146 serve to carry the boat 110 such that the hull 116 (or else, the bottom 128 of the boat 110') rests on top of these bunks 146 for over the road travel. The bunks 146 are shown as being straight but the bunks 146 might laterally taper toward each other (but only slightly) to account for the V-shape of the hull 116 (eg., the V-hull 116). The bunks 146 could also include rocker, which would better cradle the V-hull 116 of the boat 110. When launching the boat 110 or re-loading it, the trailer 100 has to be backed down a ramp 114 at the water 112's edge so far as, and to the extent that, the bunks 146 are sufficiently submerged to a depth where the boat 110 can be floated-off or reversed-off, and during reloading, to be driven/floated back onto the bunks 146.

Each bunk 146 extends between a rear end 152 and front end 154. The rear ends 152 are propped up off the rear cross beam 134. Flanking the rear ends 152 of the left and right bunks 146 are laterally-spaced left and right guide posts 160. These guide posts 160 serve as the axles that pivot in place but swing the outward extending left and right inward-swinging constrictors 104. In FIG. 2, each constrictor 104 comprises a square-D shaped frame structure 162 and 164 with an elongated vertical bar 162 carried between abbreviated, upper and lower horizontal bars 164 that are connected to the respective guide post 160. FIG. 2 shows that the constrictors 104 are normally biased (eg., spring-biased to the at-rest OPEN state) to point in the rearward direction of the respective guide post 160 (as well as in respect of the trailer 100 as a whole). Preferably, the constrictors 104 in the at-rest OPEN state would be contained in laterally-spaced, longitudinally extending (generally parallel and generally vertical) planes.

Spanning across the trailer 100 forward of the front ends 154 of the spaced left and right bunks 146 is the activation lever 102. The front ends 154 are propped up fixed off one of the heavy mid-span cross beams 136. The lever 102 is likewise connected to another of the heavy mid-span cross beams 136. But instead of being fixed to the heavy mid-span cross beam 136, the lever 102 is pivotally connected to the heavy mid-span cross beam 136.

The lever 102 comprises spaced left and right legs 166 that extend between inner and outer ends 168 and 169, and an outer cross bar 170 supported at the outer ends 169 of spaced right and left legs 166. The inner ends 168 of the spaced left and right legs 166 are pivotally connected to the heavy mid-span cross beam 136 of the trailer 100 to a pivot bar 172.

Figure 21:
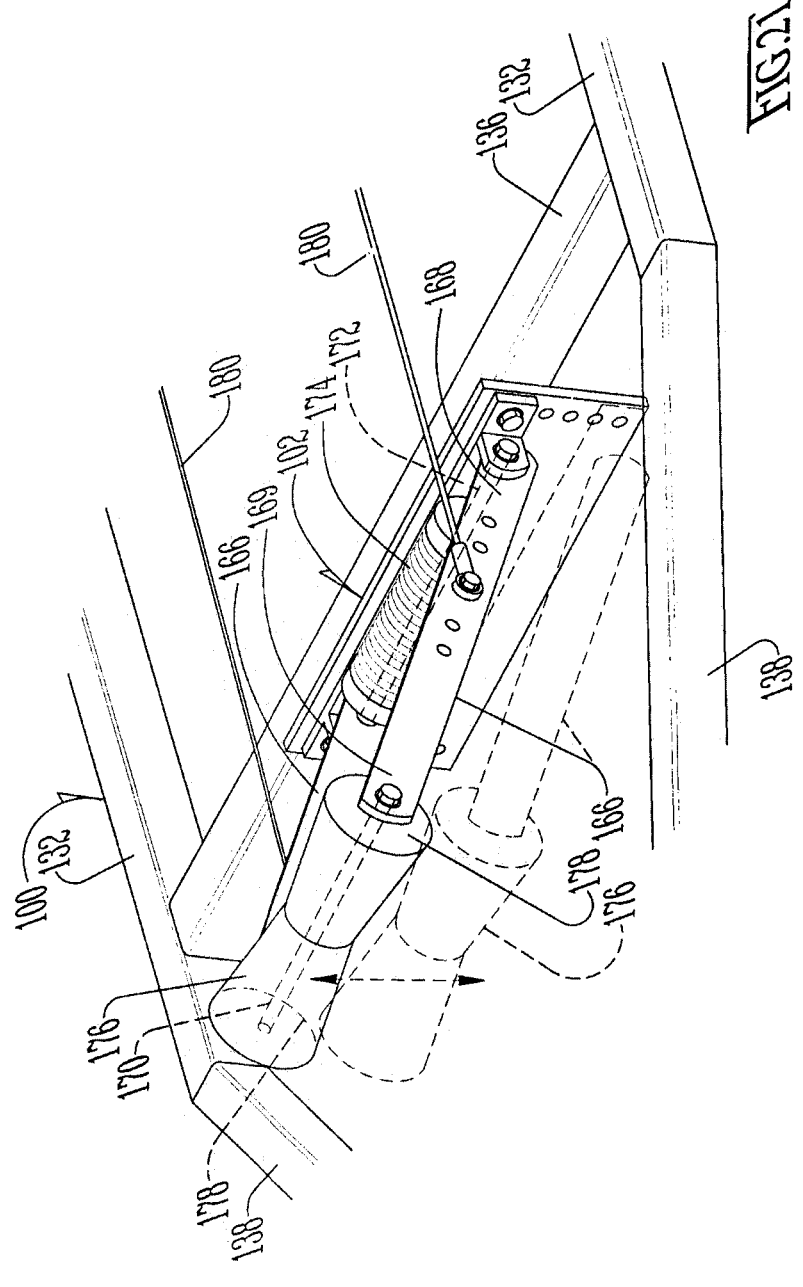
FIG. 21 is an enlarged-scale perspective view of detail 21-21 in FIG. 18.

FIG. 21 shows that the lever 102 is normally biased (eg., spring-biased) by a torsion spring 174 in at-rest generally UPRIGHT state to stand erect and pose a barrier to the bow 120 of the boat 110 during re-loading. Preferably, the lever 102 in the at-rest UPRIGHT state would be contained in a lone, laterally extending nearly-vertical plane. The cross bar 170 serves as an axle for a laterally-elongated, elastomeric roller 176. The roller 176 is generally barrel-shaped, but only generally. More particularly, the roller 176 preferably necks-in to the center from the spaced ends 178, which are circular and relatively enlarged, to a narrower center. Thus the roller 178 presents a shallow V-shape to the keel 118 or bow 120 of the boat 110 when re-loading.

In FIGS. 2, 9, 10, 12, 13 and 17-20 (eg., in the views in which such matters can be readily discerned) the drive system 106 comprises an arrangement of cables 180 and pulleys 182, but these might be replaced by cords or linkages.

Principle of Operation. As the boat 110 is being re-loaded onto the trailer 100, the boat 110 is being driven/idled forward through the guide posts 160 and thus sets up the bow 120 for a collision with the lever 102. As the bow 120 contacts the lever 102, the lever 102 reclines forwardly and is ultimately flattened by the keel 118 of the boat 110. The forward reclining of the lever 102 has the lever 102 serving as the source of INPUT power for the drive system 106. That is, the lever 102 functions as a drive crank for the drive system 106. The drive system 106 serves to convert the INPUT power of the lever 102 to the resultant OUTPUT outcome (or OUTPUT motion) in the form of the inward swinging of the constrictors 104.

Figures 12, 13:
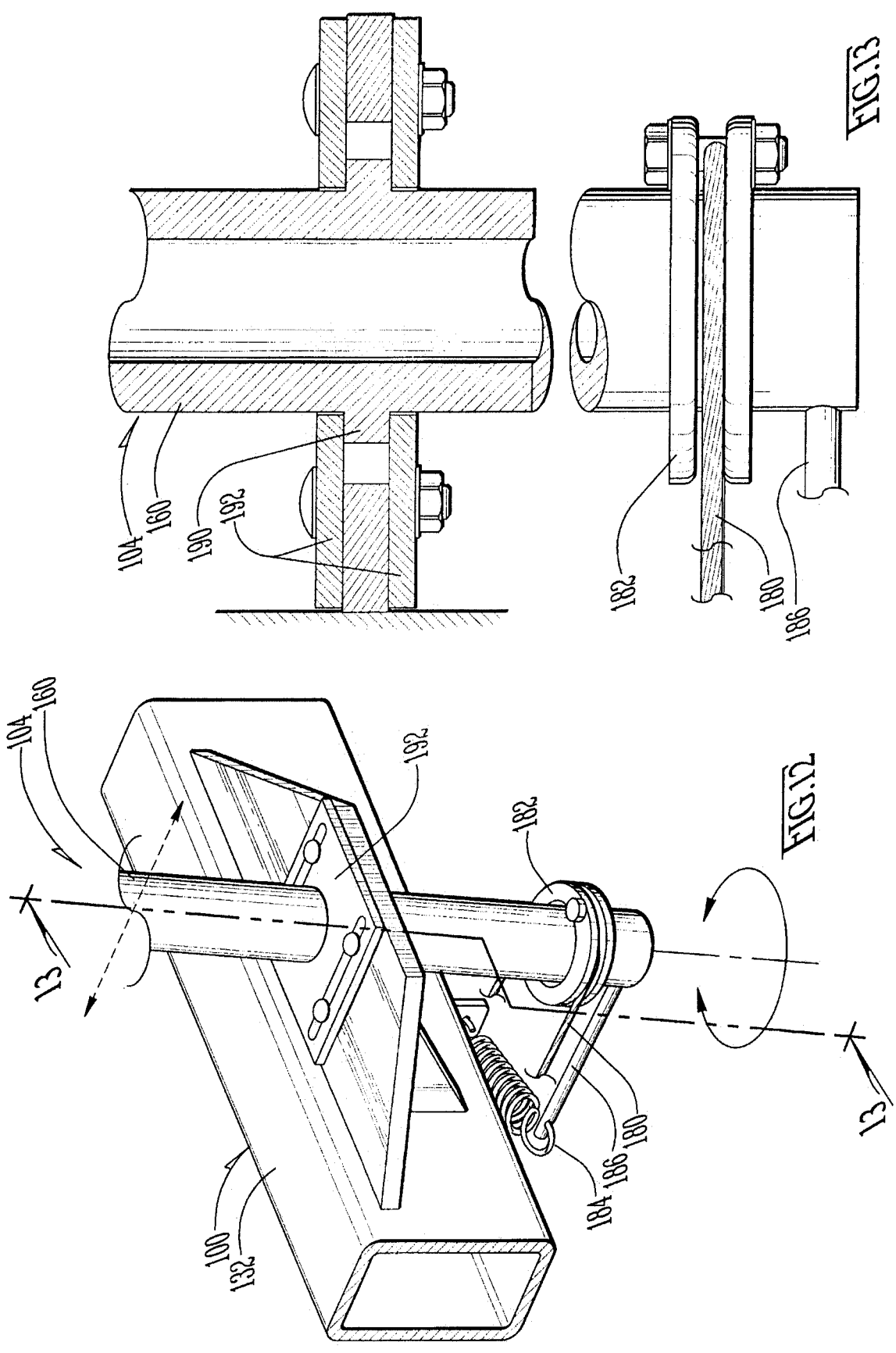
FIG. 12 is an enlarged-scale perspective view of detail 12-12 in FIG. 10.
FIG. 13 is an enlarged-scale section view taken along the line 13-13 in FIG. 12.

FIG. 12 shows that the centering constrictors 104 have tension springs 184 pulling on a torque arm 186 fixed to the respective guide post 160 for automatic reset to the OPEN state after each launch and before the subsequent re-load. A pair of tension-relief coil-tension springs 188 within the cable or linkage system 180/182 will determine and limit pressure applied to the sides of the boat 110 by the centering constrictors 104 for centering. Preferably that is, there is at least one inline tension-relief coil-tension spring 188 is mounted inline in at least one cable to keep the opposed the centering constrictors, when in CONSTRICTION state, in constant contact with the rub rail, gunwale or sides of the boat 110/110', as shown by example in FIG. 9.

FIGS. 3 through 9 serve as a slide show to show the operation of re-loading the boat 110 and the assistance provided by the centering provisions 102, 104 and 106.

FIG. 3 shows the trailer 100 in preparation for hauling out the boat 110. Not shown here are any indications of a ramp 114 or water 112's edge which are at least as sketchily indicated in FIGS. 15 and 16. But the trailer 100 here in this view is likewise disposed on a ramp 114 (again not shown) halfway or more into the water 112 and the boat 110 here is afloat behind the trailer 100. FIG. 3 serves as a reference view because, the boat 110 here is shown in an idealized perfect alignment.

In contrast, FIG. 4 shows obvious misalignment. When seeking to park the boat 110 back onto the trailer 100, this is surely unintentional according the best wishes of the driver (not shown). But this is perhaps the unavoidable consequence of crosswinds, or waves or current and so on.

Figures 5, 6:
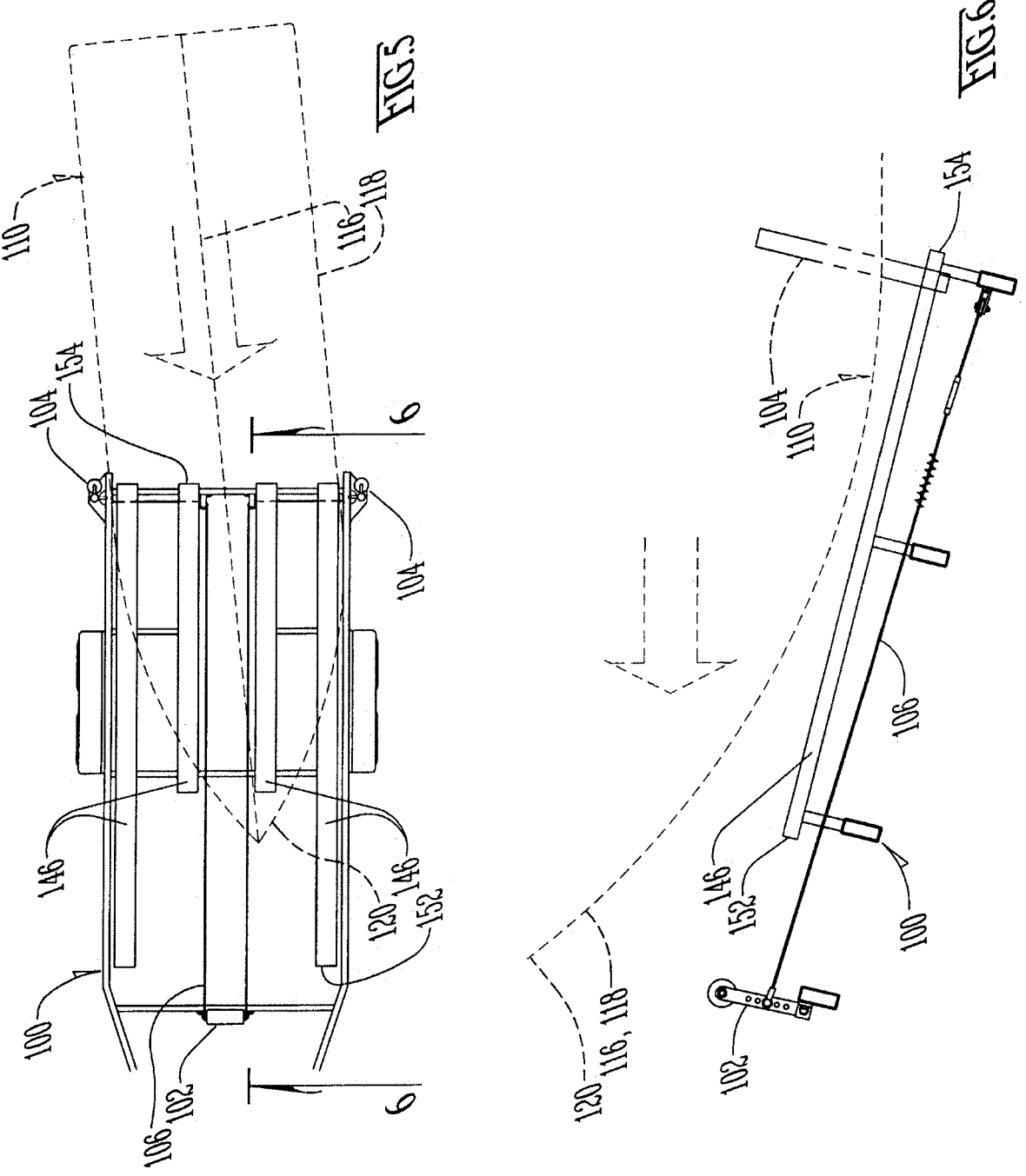
FIG. 5 is a top plan schematic view comparable to FIGS. 3 and 4 except showing the boat even moreover further along in the re-loading process, and showing the centering provisions providing centering assistance which will be more particularly shown in FIGS. 6-9 next.
FIG. 6 is an enlarged-scale side elevation view of FIG. 5, taken in the direction of arrows 6-6 in FIG. 5, showing the keel of the bow-portion of the boat making initial contact with a roller mounted on a cross bar of a mechanical lever, whose ninety-degree or so throw forward and down (~90° counterclockwise in this view) supplies the power INPUT for the actuation of a pair of laterally-spaced opposed the centering constrictions, changing their relative positions from an OPEN state where the constrictors are relatively widely spaced apart, to, a CONSTRICTION state where the constrictors are relatively moved inward toward each other.

FIG. 5 is a top plan schematic view comparable to FIGS. 3 and 4 except showing the boat 110 even moreover further along in the re-loading process, and showing the centering provisions 102, 104 and 106 providing centering assistance which will be more particularly shown in FIGS. 6-9 next.

FIG. 6 shows the keel 118 of the bow-portion 120 of the boat 110 making initial contact with the roller 176 mounted on the cross bar 170 of the mechanical lever 102, whose ninety-degree or so throw (forward and down) (or ~900 counterclockwise rotation in this view) supplies the power INPUT for the actuation of the pair of laterally-spaced opposed the centering constrictors 104, changing their relative positions from an OPEN state where the constrictors 104 are relatively widely spaced apart, to, a CONSTRICTION state where the constrictors 104 are relatively moved inward toward each other.

FIG. 7 shows the boat 110 fully loaded onto the trailer 100. FIG. 8 is a side elevation view taken in the direction of arrows 8-8 in FIG. 7, showing the keel 118 of the boat 110 has essentially flattened the lever 102.

Figure 9:
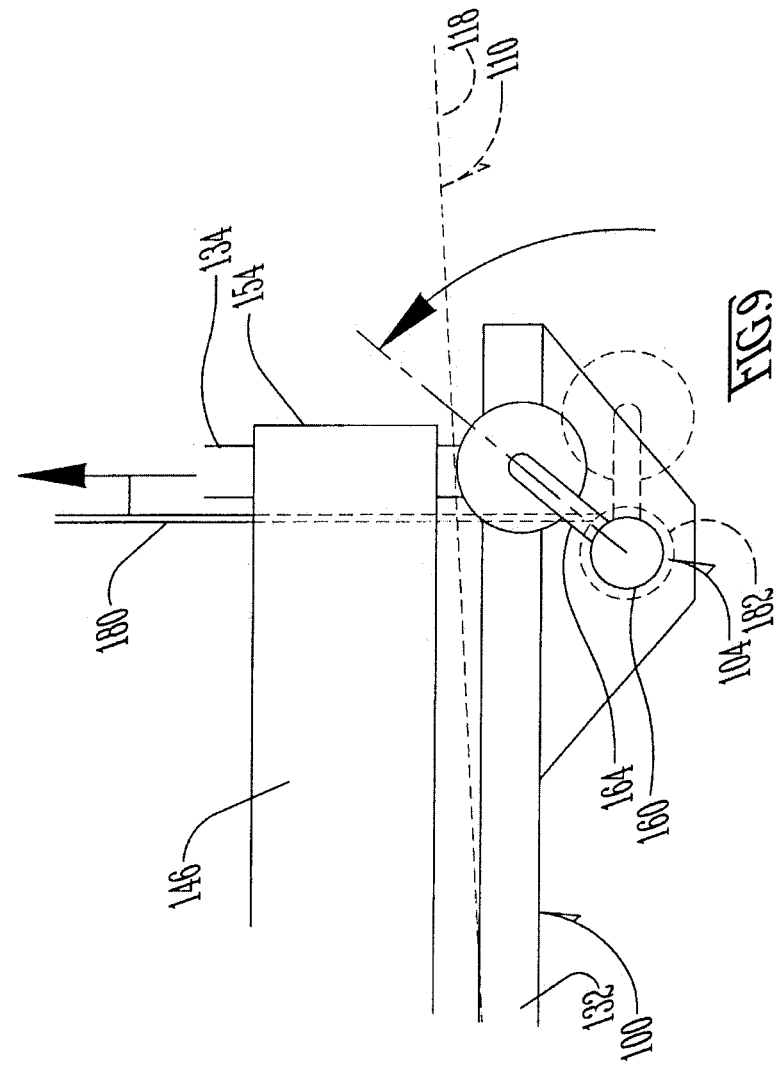
FIG. 9 is an enlarged-scale top plan schematic view of detail 9-9 in FIG. 7, showing the left-side constrictor only, wherein the OPEN state is shown in dashed line and the CONSTRICTION state is shown in solid line, and moreover the left side constrictor is shown in contact with a spot on the rub rail on the port side of the boat.

FIG. 9 is an enlarged-scale top plan schematic view of detail 9-9 in FIG. 7, showing the left-side constrictor 104 only. The OPEN state is shown in dashed line and the CONSTRICTION state is shown in solid line. Moreover, the left side constrictor 104 is shown in contact with a spot on the rub rail 122 on the port side of the boat 110.

FIG. 10 is a full perspective view of the left side constrictor 104 of FIG. 9 supported by its respective guide post 160 which is driven by the actuation of the lever 102 to pivot like an axle. The guide post 160 pivots between about a ninety-degree arc (~90°) between counterclockwise and clockwise extremes (vice versa for the right side guide post 160).

FIG. 11 shows that the D-shaped frame of the constrictor 104 mounts through a slot in the guide post 160. The elevation of the constrictor can be adjusted and set as shows by the dashed lines.

FIGS. 12 and 13 show the bearing structure of the guide post 160. That is, the bearing structure comprises a circular flange 190 fixed to the guide post 160 trapped between to vertically spaced plates 192 with apertures sized to allow extension of pivotal oscillation of the guide post 160. FIGS. 12 and 13 show that the drive cable 180 is looped around a pulley 182 therefor. The pulley 182 is fixed to the guide post 160. The cable 180 is fixed to the pulley 182. And therefor the cable both 180 pushes and pulls the pulley 182 when pivoting the pulley 182 and thus the constrictors 104.

Figure 14:
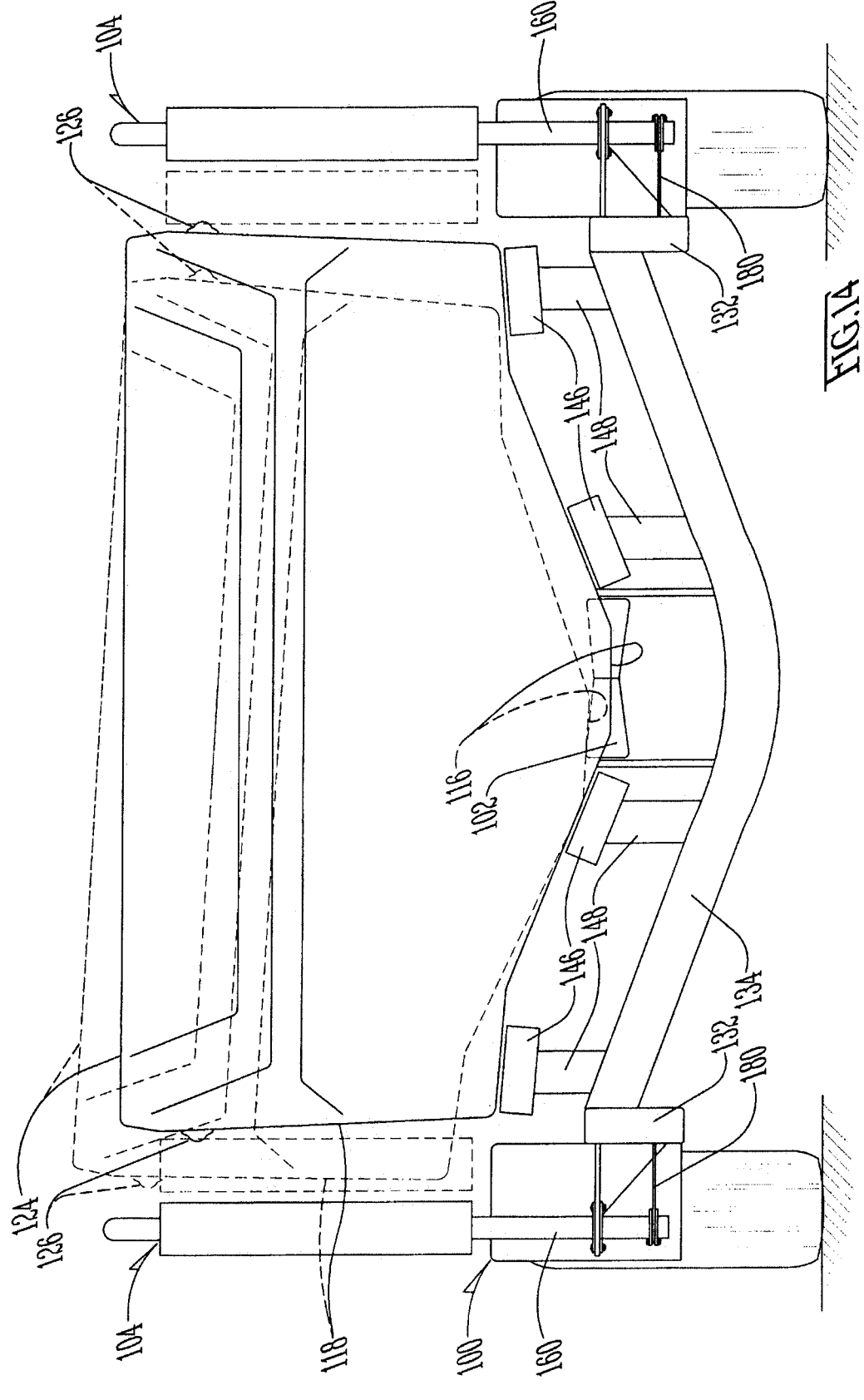
FIG. 14 is an enlarged-scale rear, end elevation view of FIG. 1, wherein a properly centered boat is shown in solid line, centered and level:—while dashed lines are used to indicate an improperly loaded boat that is off-center and tilted.

FIG. 14 shows in solid in solid line the intended result—: a centered and level boat 110. Dashed lines are used to indicate what is to be avoided:—an improperly loaded boat 110 that is off-center and tilted.

Figure 17:
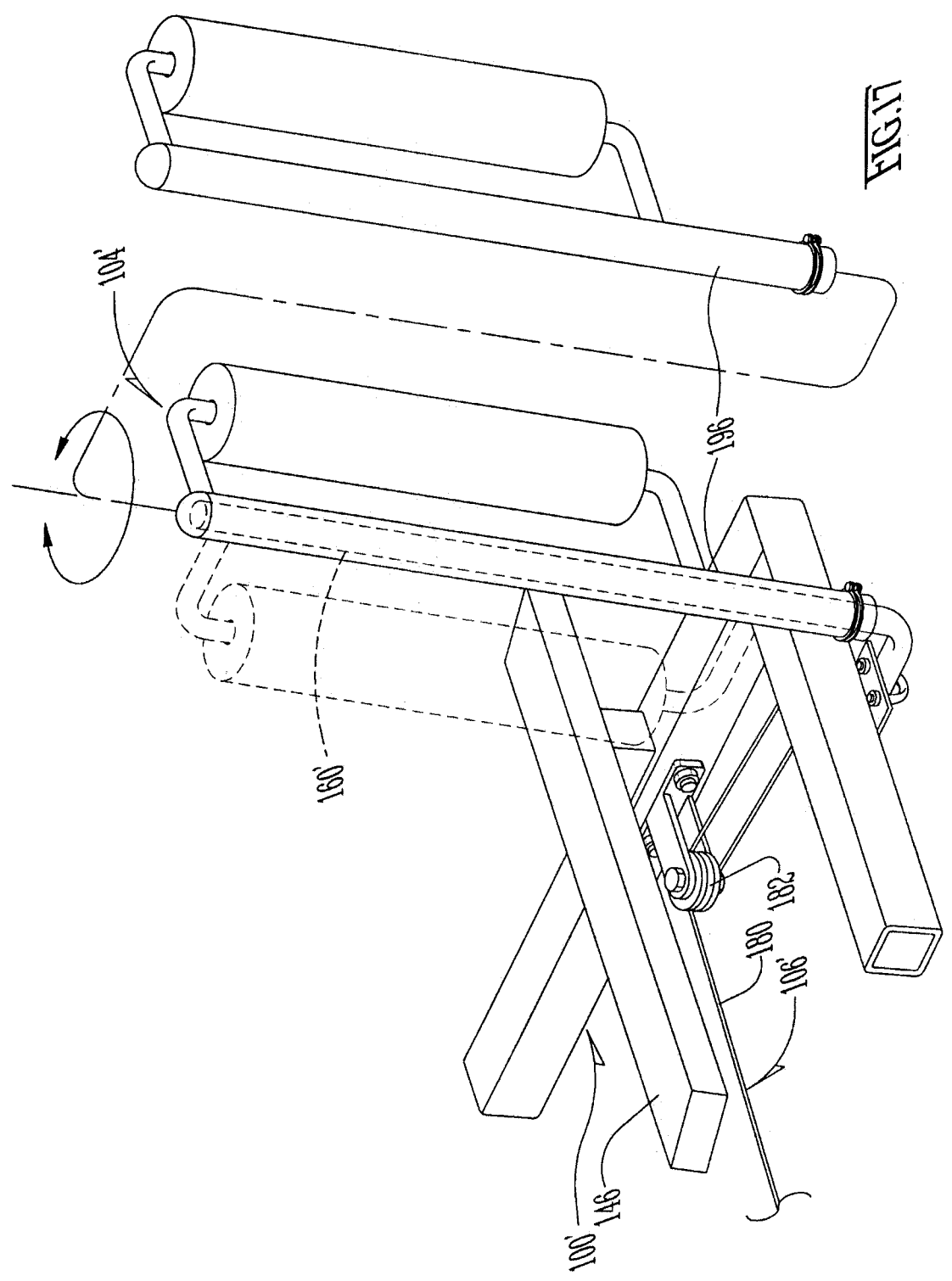
FIG. 17 is an enlarged-scale perspective view of detail 17-17 in FIG. 16.

FIGS. 15 and 16 are comparable to in FIG. 4 inasmuch as showing the beginning stages of driving/idling a boat 110' back onto a trailer 100', except showing an alternate embodiment of a trailer 100' in accordance with the invention, provided with an alternate embodiment of centering provisions 102, 104' and 106 in accordance with the invention, and a different style of boat 110' (eg., a flat-bottomed boat 110'). FIG. 17 is an enlarged-scale perspective view of detail 17-17 in FIG. 16. Here, the guide post 160' is stationary. The D-shaped wing structure of the constrictor 104' is mounted on a tubular sleeve 196. The sleeve 196 is slid over the guide post 160' (which is tubular too) and the drive cable 180 pivots the sleeve 196.

Figure 18:
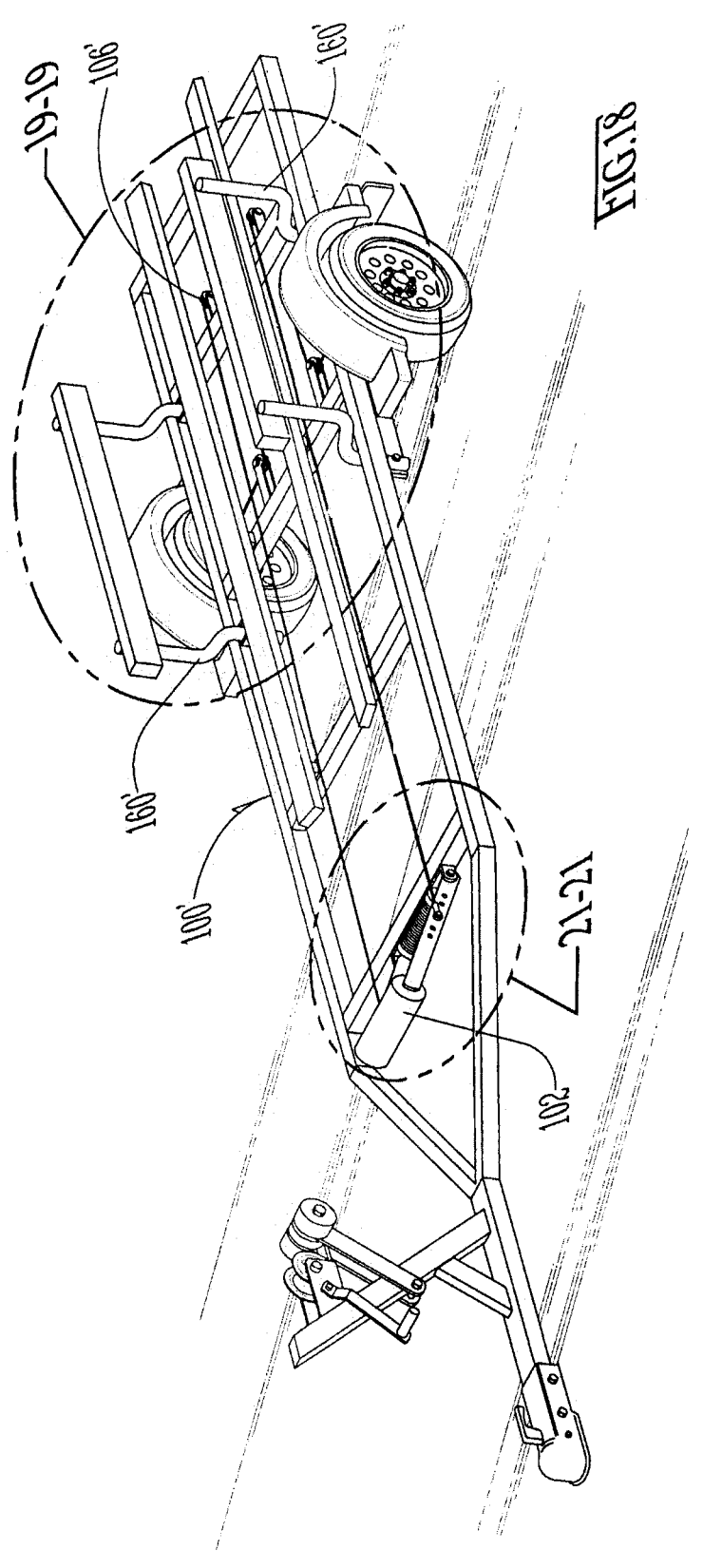
FIG. 18 is a perspective view comparable to FIG. 1 except showing still another embodiment of a trailer in accordance with the invention, provided with yet another embodiment of centering provisions in accordance with the invention.
Figure 19:
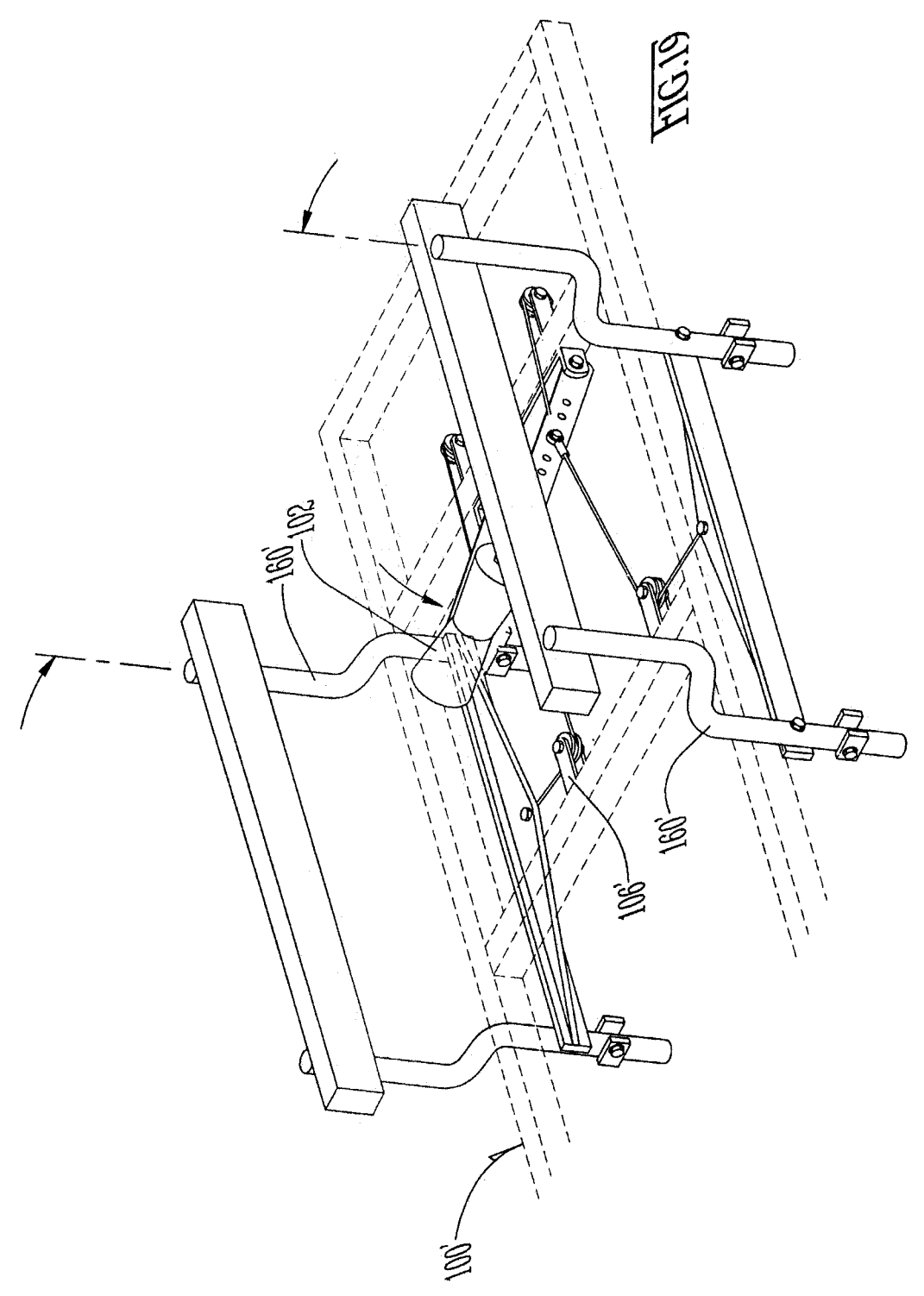
FIG. 19 is an enlarged-scale perspective view of detail 19-19 in FIG. 18.

FIGS. 18 and 19 show still another embodiment of a trailer 100' in accordance with the invention, provided with yet another embodiment of centering provisions 102, 104' and 106' in accordance with the invention. The constrictors 104' are no longer wings which flap about generally vertical axes, but horizontal rails which rock about horizontal axes between the relatively OPEN state (as shown) and the relatively CONSTRICTED state. The guide posts 160 of the previous figures are replaced with side posts 160'

Figure 20:
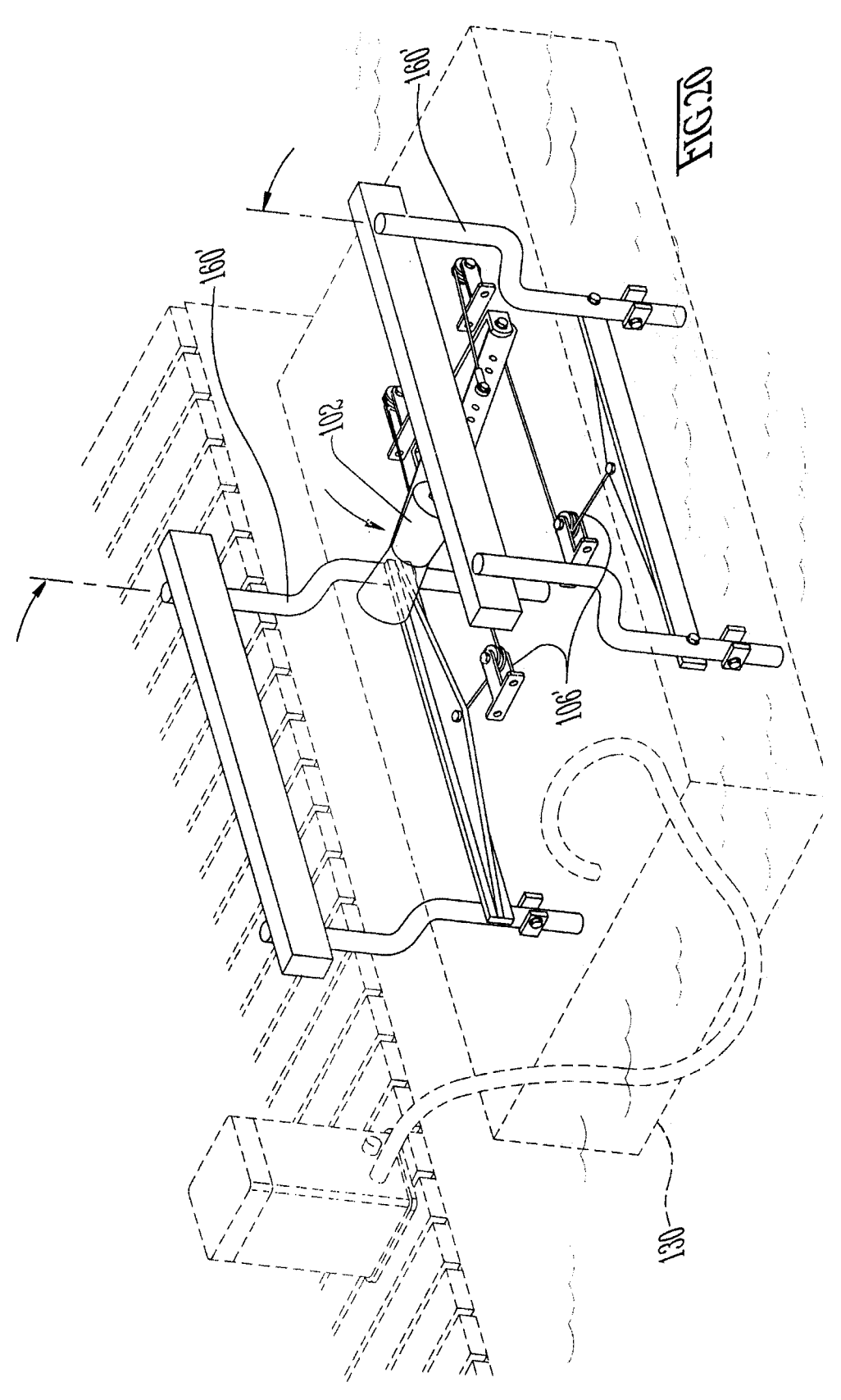
FIG. 20 is a perspective view of a boat lift in accordance with the invention, provided with centering provisions in accordance with the invention more nearly like the centering provisions embodiment of FIGS. 18 and 19, for assisting guidance and centering of a boat when being parked into a boat slip of a dock or marina and the like, wherein the lift air tank and source of pressurized air are indicated in dashed lines but the bunks which actually contact the hull of the boat when lifted are not represented in this view (as the boat is also excluded)

Now to leave behind trailers 100 and turn to boat lifts 130, FIG. 20 is a perspective view of a boat lift 130 in accordance with the invention, provided with centering provisions 102, 104' and 106' in accordance with the invention. These centering provisions 102, 104' and 106' here in FIG. 20 are more like the centering provision embodiment 102, 104' and 106' of FIGS. 18 and 19, for assisting guidance and centering of a boat 110' when being parked into a boat slip of a dock or marina and the like.

The boat lift 130 comprises one or more air tanks (only one shown). The air tanks are made buoyant with an injection of pressurized air, in which air is trapped in a sealed headspace in the air tank. Thus the buoyant air tanks float and with sufficient a flotation capacity to support a boat 110' out of water. The boat 110' can be returned to water by bleeding out the air by a valve and thus the air tank/lift 130 sinks. A typical boat lift 130 would include a framework (not shown) connecting all the air tanks together (again, only one shown). The framework will have a forward end which is likely hinged to the closed end of slip to pivot up and down. The framework is just as likely to have a rear end chained to both sides of the open end of the slip limit the extreme angle to which it can pivot down to. The source of pressurized air and portions of the walkway of the slip are indicated in dashed lines. But the bunks which actually contact the hull of the boat 110' when lifted are not represented in this view (and neither is a boat and nor is the framework of the lift, any chains or hinge and so on).

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A boat trailer with boat centering provisions for assisting guidance and centering of a boat when being re-loaded onto the trailer; comprising:

a trailer frame comprising laterally-spaced horizontally-elongated left and right side beams extending between front and rear ends, said side beams coming together in a forward terminus comprising a tongue, and said side beams being spaced apart by not only a rear cross beam proximate the rear ends but also at least one mid-span cross beam disposed between the rear cross beam and the front ends;

said trailer frame further comprising laterally-spaced elevationally-elongated left and right guide posts extending between top and bottom ends, said left and right guide posts mounted proximate the rear ends of the left and right side beams respectively by a given manner of mounting, said guide posts defining a passageway width therebetween that is contained in a lateral plane and is wider than the widest width of the boat elevationally lower than the top ends of the guide posts, thereby allowing free passage of the boat during launching and re-loading operations;

a left centering constrictor mounted with respect to the left guide post and left side beam, and a right centering constrictor mounted with respect to the right guide post and right side beam, by another given manner of mounting;

one or both of (1) the given manner of mounting of the guide posts and/or (2) the other given manner of mounting of the centering constrictors comprise coupled structures that both (A) allow the centering constrictors to move between an OPEN state where the centering constrictors are relatively widely spaced apart, to, a CONSTRICTION state where the centering constrictors are relatively moved inward toward each other and define a constricted width that is narrower than the passageway width, and (B) dispose the centering constrictors relative the lateral plane of the passageway width such that the centering constrictors provide guidance and centering of the boat when being re-loaded onto the trailer along the boat's rub rail, gunwale or sides;

a keel-driven lever drivable from an at-rest boat-offloaded position and an actuated boat-onboard position when driven over by the keel of the boat, thereby supplying power INPUT for the actuation of the pair of laterally-spaced opposed the centering constrictors; and a drive system connected between the lever and the centering constrictors to actuate the centering constrictors between the OPEN and CONSTRICTION states therefor.

2. The boat trailer with boat centering provisions of claim 1, wherein:

the given manner of mounting the left and right centering constrictors comprises affixation to the left and right guide posts respectively;

the given manner of mounting the left and right guide posts comprises pivotable mounts to the left and right side beams respectively; and the drive system comprises a mechanical rig to drive the guide posts in pivots between clockwise and counter-clockwise extremes.

3. The boat trailer with boat centering provisions of claim 1, wherein:

the guide posts comprise cylindrical bodies;

the given manner of mounting the left and right guide posts comprises affixation to the left and right side beams respectively;

the given manner of mounting the left and right centering constrictors comprises affixation to tubular sleeves that are slid over the left and right guide posts respectively and can pivot thereon; and the drive system comprises a mechanical rig to drive the sleeves in pivots between clockwise and counterclockwise extremes.

4. The boat trailer with boat centering provisions of claim 1, wherein:

the drive system comprises cables and pulleys.

5. The boat trailer with boat centering provisions of claim 4, wherein:

the drive system further comprises at least one return spring to return the centering constrictors to the OPEN state therefor and the lever to the at-rest boat-offloaded position therefor.

6. The boat trailer with boat centering provisions of claim 4, wherein:

the drive system further comprises a left side and right side tension spring to return the centering constrictors to the OPEN state therefor, and, a torsion spring to return the lever to the at-rest boat-offloaded position therefor.

7. The boat trailer with boat centering provisions of claim 4, wherein:

at least one cable of the drive system comprises at least one inline tension-relief coil-tension spring to keep the opposed the centering constrictors, when in CONSTRICTION state, in constant contact with the rub rail, gunwale or sides of the boat.

8. A boat trailer with boat centering provisions for assisting guidance and centering of a boat when being re-loaded onto the trailer; comprising:

a trailer frame comprising laterally-spaced horizontally-elongated left and right side beams extending between front and rear ends, said side beams being spaced apart by not only a rear cross beam proximate the rear ends but also at least one mid-span cross beam disposed between the rear cross beam and the front ends;

said trailer frame further comprising laterally-spaced elevationally-elongated left and right guide posts extending between top and bottom ends, said left and right guide posts mounted proximate the rear ends of the left and right side beams respectively by a given manner of mounting, said guide posts defining a passageway width therebetween that allows free passage of the boat during launching and re-loading operations;

a left centering constrictor mounted with respect to the left guide post and left side beam, and a right centering constrictor mounted with respect to the right guide post and right side beam, by another given manner of mounting;

one or both of (1) the given manner of mounting of the guide posts and/or (2) the other given manner of mounting of the centering constrictors comprise coupled structures that allow the centering constrictors to move between an OPEN state where the centering constrictors are relatively widely spaced apart, to, a CONSTRICTION state where the centering constrictors are relatively moved inward toward each other and define a constricted width that is narrower than the passageway width;

a keel-driven lever drivable from an at-rest boat-offloaded position and an actuated boat-onboard position when driven over by the keel of the boat; and a drive system connected between the lever and the centering constrictors to actuate the centering constrictors between the OPEN and CONSTRICTION states therefor.

9. The boat trailer with boat centering provisions of claim 8, wherein:

the given manner of mounting the left and right centering constrictors comprises affixation to the left and right guide posts respectively;

the given manner of mounting the left and right guide posts comprises pivotable mounts to the left and right side beams respectively; and the drive system comprises a mechanical rig to drive the guide posts in pivots between clockwise and counter-clockwise extremes.

10. The boat trailer with boat centering provisions of claim 8, wherein:

the guide posts comprise cylindrical bodies;

the given manner of mounting the left and right guide posts comprises affixation to the left and right side beams respectively;

the given manner of mounting the left and right centering constrictors comprises affixation to tubular sleeves that are slid over the left and right guide posts respectively and can pivot thereon; and the drive system comprises a mechanical rig to drive the sleeves in pivots between clockwise and counterclockwise extremes.

11. The boat trailer with boat centering provisions of claim 8, wherein:

the drive system comprises cables and pulleys.

12. The boat trailer with boat centering provisions of claim 11, wherein:

the drive system further comprises at least one return spring to return the centering constrictors to the OPEN state therefor and the lever to the at-rest boat-offloaded position therefor.

13. The boat trailer with boat centering provisions of claim 11, wherein:

the drive system further comprises a left side and right side tension spring to return the centering constrictors to the OPEN state therefor, and, a torsion spring to return the lever to the at-rest boat-offloaded position therefor.

14. An improvement for the processes of either loading a boat onto a boat trailer or parking a boat onto a boat lift;

wherein the boat trailer is characterized by laterally-spaced horizontally-elongated left and right side beams extending between front and rear ends, said side beams being spaced apart by not only a rear cross beam proximate the rear ends but also at least one mid-span cross beam disposed between the rear cross beam and the front ends, the left side beam comprising at least a pair of longitudinally-spaced left-side pivot-mount fix-tures, the right side beam comprising at least a pair of longitudinally-spaced right-side pivot-mount fixtures; and wherein the boat lift is characterized by a base structure defining laterally-spaced horizontally-elongated left and right side fixture-mounting axes, said base structure comprising at least a pair of longitudinally-spaced left-side pivot-mount fixtures on the left-side fixture axis thereof and a pair of longitudinally-spaced right-side pivot-mount fixtures on the right-side fixture axis thereof;

said improvement comprising:

a pair of longitudinally-spaced elevationally-elongated left-side guide posts extending between top ends and bottom ends pivotally mounted with respect to the pair of left-side pivot-mount structures;

a pair of longitudinally-spaced elevationally-elongated right-side guide posts extending between top ends and bottom ends pivotally mounted with respect to the pair of right-side pivot-mount structures;

a horizontally-elongated left-side centering constrictor mounted across the left pair of guide posts proximate the top ends thereof so as to provide a port-side inboard rub-rail surface;

a horizontally-elongated right-side centering constrictor mounted across the right pair of guide posts proximate the top ends thereof so as to provide a starboard-side inboard rub-rail surface;

wherein the pivotal mountings of the guide posts afford the laterally-opposed centering constrictors to pivot between outboard extremes comprising an OPEN state and define a passageway width therebetween allowing free passage of the boat during launching and loading operations, and, inboard extremes comprising a CON-STRICTION state and define a constricted width ther-ebetween that is narrower than the passageway width and further that the centering constrictors provide guid-ance and centering of the boat when being loaded onto the trailer or parked onto the lift by contact along the boat's rub rail, gunwale or sides at elevations lower than the top ends of the guide posts;

a keel-driven lever drivable from an at-rest boat-offloaded position and an actuated boat-onboard position when driven over by the keel of the boat, thereby supplying power INPUT for the actuation of the pair of laterally-spaced opposed the centering constrictors; and a drive system connected between the lever and the centering constrictors to actuate the centering constric-tors between the OPEN and CONSTRICTION states therefor.

15. The improvement of claim 14, wherein:

the drive system comprises a mechanical rig to drive the guide posts in pivots between the outboard and inboard extremes.

16. The improvement of claim 14, wherein:

the drive system comprises cables and pulleys.

17. The improvement of claim 16, wherein:

the drive system further comprises at least one return spring to return the centering constrictors to the OPEN state therefor and the lever to the at-rest boat-offloaded position therefor.

18. The improvement of claim 16, wherein:

the drive system further comprises a left side and right side tension or torsion spring to return the centering constrictors to the OPEN state therefor, and, a torsion spring to return the lever to the at-rest boat-offloaded position therefor.

19. The improvement of claim 14, wherein:

at least one cable of the drive system comprises at least one inline tension-relief coil-tension spring to keep the opposed the centering constrictors, when in CON-STRICTION state, in constant contact with the rub rail, gunwale or sides of the boat.

20. The improvement of claim 17, wherein:

the boat lift comprises a pneumatic boat lift.

* * * * *